US008984647B2

(12) United States Patent
Sandoval et al.

(10) Patent No.: US 8,984,647 B2
(45) Date of Patent: Mar. 17, 2015

(54) SYSTEMS, METHODS, AND COMPUTER READABLE MEDIA FOR SECURITY IN PROFILE UTILIZING SYSTEMS

(75) Inventors: Michael Sandoval, Kirkland, WA (US); Oliver Bruce Downs, Redmond, WA (US)

(73) Assignee: Atigeo LLC, Bellevue, WA (US)

( * ) Notice: Subject to any disclaimer, the term of this patent is extended or adjusted under 35 U.S.C. 154(b) by 528 days.

(21) Appl. No.: 13/102,706

(22) Filed: May 6, 2011

(65) Prior Publication Data

US 2011/0276563 A1 Nov. 10, 2011

Related U.S. Application Data

(60) Provisional application No. 61/332,061, filed on May 6, 2010.

(51) Int. Cl.
*H04L 29/06* (2006.01)
*G06F 21/62* (2013.01)

(52) U.S. Cl.
CPC .......... *G06F 21/6245* (2013.01); *H04L 63/102* (2013.01)
USPC ................................. 726/26; 726/27; 726/30

(58) Field of Classification Search
CPC ....... H04L 63/10; H04L 63/102; G06F 21/62; G06F 21/6245
USPC ...................................................... 726/26–30
See application file for complete search history.

(56) References Cited

U.S. PATENT DOCUMENTS

| | | | |
|---|---|---|---|
| 6,385,602 B1 | 5/2002 | Tso et al. |
| 6,408,290 B1 | 6/2002 | Thiesson et al. |
| 6,434,556 B1 | 8/2002 | Levin et al. |
| 6,453,347 B1 | 9/2002 | Revashetti et al. |
| 6,560,590 B1 | 5/2003 | Shwe et al. |
| 6,581,072 B1 | 6/2003 | Mathur et al. |
| 6,961,731 B2 | 11/2005 | Holbrook |
| 7,149,733 B2 | 12/2006 | Lin et al. |
| 7,191,182 B2 | 3/2007 | Anonsen et al. |
| 7,237,245 B2 | 6/2007 | Hinson et al. |

(Continued)

FOREIGN PATENT DOCUMENTS

| | | |
|---|---|---|
| WO | 2004/066163 A1 | 8/2004 |
| WO | 2009081393 A2 | 7/2009 |
| WO | 2009108724 A2 | 9/2009 |

OTHER PUBLICATIONS

Personalized Access to Information by Query Reformulation Based on the State of the Current Task and User Profile, Asfari et al, IEEE 2009.*

(Continued)

*Primary Examiner* — Bradley Holder
*Assistant Examiner* — Jahangir Kabir

(57) ABSTRACT

Security and distributed storage is described for systems using electronic profile information. Embodiments may be utilized for ID, data, and access analysis. Dynamic distributed redundant encryption may be used that may be based on user, device, location, context information, physical, or environmental characteristics. In one implementation, encrypted electronic profiles are stored on behalf of users by a profiling system, allowing user information within the electronic profiles to be accessed only by decryption of a portion of the electronic profile by the profiling system using distributed decryption codes.

11 Claims, 7 Drawing Sheets

(56) References Cited

U.S. PATENT DOCUMENTS

| | | | |
|---|---|---|---|
| 7,257,817 | B2 | 8/2007 | Cabrera et al. |
| 7,296,022 | B2 | 11/2007 | Harjanto |
| 7,627,599 | B2 | 12/2009 | Heer et al. |
| 7,644,098 | B2 | 1/2010 | Patel et al. |
| 7,657,507 | B2 * | 2/2010 | Shi et al. ............... 707/999.002 |
| 7,779,004 | B1 | 8/2010 | Walsh et al. |
| 7,801,901 | B2 | 9/2010 | Surendran |
| 2002/0129014 | A1 | 9/2002 | Kim et al. |
| 2002/0184401 | A1 | 12/2002 | Kadel et al. |
| 2003/0154129 | A1 | 8/2003 | Goff |
| 2003/0204496 | A1 | 10/2003 | Ray et al. |
| 2003/0229507 | A1 | 12/2003 | Perge |
| 2004/0128508 | A1 | 7/2004 | Wheeler et al. |
| 2004/0158569 | A1 | 8/2004 | Evans et al. |
| 2005/0043989 | A1 | 2/2005 | Shifrin |
| 2005/0076060 | A1 | 4/2005 | Finn et al. |
| 2005/0216434 | A1 * | 9/2005 | Haveliwala et al. ............... 707/1 |
| 2005/0222989 | A1 | 10/2005 | Haveliwala et al. |
| 2005/0257400 | A1 | 11/2005 | Sommerer et al. |
| 2006/0122994 | A1 | 6/2006 | Kapur et al. |
| 2006/0195515 | A1 | 8/2006 | Beaupre et al. |
| 2006/0294084 | A1 | 12/2006 | Patel et al. |
| 2007/0038608 | A1 | 2/2007 | Chen |
| 2007/0038765 | A1 | 2/2007 | Dunn |
| 2007/0100898 | A1 | 5/2007 | Petras et al. |
| 2007/0106659 | A1 | 5/2007 | Lu et al. |
| 2007/0130109 | A1 | 6/2007 | King et al. |
| 2007/0136371 | A1 | 6/2007 | Golobay et al. |
| 2007/0162443 | A1 | 7/2007 | Liu et al. |
| 2007/0168546 | A1 | 7/2007 | Greeff |
| 2007/0225995 | A1 | 9/2007 | Moore |
| 2007/0266019 | A1 | 11/2007 | Lavi |
| 2008/0009268 | A1 | 1/2008 | Ramer et al. |
| 2008/0040219 | A1 | 2/2008 | Kim et al. |
| 2008/0046313 | A1 | 2/2008 | Chen |
| 2008/0104048 | A1 | 5/2008 | Surendran |
| 2008/0134086 | A1 | 6/2008 | Liao et al. |
| 2008/0140521 | A1 | 6/2008 | Jambunathan et al. |
| 2008/0263022 | A1 | 10/2008 | Kostorizos et al. |
| 2008/0300986 | A1 | 12/2008 | Lee |
| 2009/0063473 | A1 | 3/2009 | Van Den Berg et al. |
| 2009/0070412 | A1 | 3/2009 | D'angelo et al. |
| 2009/0094093 | A1 | 4/2009 | Phan |
| 2009/0106324 | A1 | 4/2009 | Gutlapalli et al. |
| 2009/0171697 | A1 | 7/2009 | Glauser et al. |
| 2009/0216563 | A1 | 8/2009 | Sandoval et al. |
| 2009/0216639 | A1 | 8/2009 | Kapczynski et al. |
| 2009/0216696 | A1 | 8/2009 | Downs et al. |
| 2009/0216750 | A1 | 8/2009 | Sandoval et al. |
| 2009/0287683 | A1 | 11/2009 | Bennett |
| 2009/0327259 | A1 | 12/2009 | Smith |
| 2009/0327327 | A1 | 12/2009 | Sathish |
| 2010/0153324 | A1 | 6/2010 | Downs et al. |
| 2010/0228715 | A1 | 9/2010 | Lawrence |
| 2010/0242121 | A1 * | 9/2010 | Johnson et al. ............... 726/28 |
| 2010/0328312 | A1 | 12/2010 | Donaldson |

OTHER PUBLICATIONS

Personalized Advertising Strategy for Integrated Social Networking Websites, Hsieh et al, IEEE 2008.*

Extended European Search Report mailed Jun. 6, 2011 for Application No. 11150913.9.

International Search Report and Written Opinion mailed Nov. 9, 2009 for International Application No. PCT/US2009/035197.

Office Action dated Apr. 28, 2011 for EP Application No. 09714387.9.

amazon.com, "Statistically Improbable Phrases", retrieved on Feb. 24, 2009, from http://amazon.com/gp/search-inside/sipshelp.html, pp. 1.

Barnes, Jeffrey M. "Object-Relational Mapping as a Persistence Mechanism for Object Oriented Applications", An honors project presented to the Department of Mathematics and Computer Science, Apr. 28, 2007, pp. 3-113.

Burke, R. "Hybrid Recommender Systems: Survey and Experiments", User Modeling and User-Adaptive Interaction, Feb. 2002, pp. 1-29.

choicestream.com, "About ChoiceStream", retrieved on Feb. 24, 2009, from http://choicestream.com/company, pp. 1-2.

Fiaidhi, et al., "A Standard Framework for Personalization Via Ontology-Based Query Expansion", Pakistan Journal of Information and Technology 2 (2), 2003, pp. 96-103.

Kngine, "Web 3.0 Search Engine", Kngine Overview, pp. 1-4.

matchmine.com, "Frequently Asked Questions", retrieved on Feb. 24, 2009, from http://web.archieve.org/web/20071026055031m_1/www.matchmine.com/help, pp. 1-2.

Peltarion, "Applications of Adaptive Systems", retrieved on Feb. 24, 2009, from http://peltarion.com/doc/index.php?title=Applications_of_adaptive_systems, pp. 1-7.

Riezler, et al., "Statistical Machine Translation for Query Expansion in Answer Retrieval", retrieved on Feb. 24, 2009 from http://www.scialert.net, pp. 1-7.

Strands, "Company Overview", retrieved on Feb. 24, 2009, from http://corp.strands.com, pp. 1.

Strands, "History and Name", retrieved on Feb. 24, 2009, from http://corp.strands.com/history, pp. 1-2.

Sun Microsystems, "Metadata for Object Relational Mapping", Enterprise JavaBeans 3.0, Final Release, May 2, 2006, pp. 163-208.

Wikipedia, "Query Expansion", retrieved on Feb. 24, 2009 from http://en.wikipedia.org/wiki/Query_expansion, pp. 1-3.

Wikipedia, "Recommender System", retrieved on Feb. 24, 2009 from http://en.wikipedia.org/wiki/recommendation_engine, pp. 1-4.

Wikipedia, "tf-idf", retrieved on Feb. 24, 2009 from http://en.wikipedia.org/wiki/Tf-idf, pp. 1-3.

Zhang, S. et al., "An Online Personalized Recommendation Model Based on Bayesian Networks", retrieved on Aug. 21, 2009 from http://springerlink.com/content/r827252065g60728/, 2007, pp. 1575-1584.

Branzan, Claudiu et al., "Relevance Networks for Cold Start Inference of User Preferences", http://snowbirb.djvuzone.org/2010/posters.html, 2010.

International Search Report and Written Opinion for PCT Application No. PCT/US2011/035628, dated Jan. 16, 2012.

* cited by examiner

SYSTEMS, METHODS, AND COMPUTER READABLE MEDIA FOR SECURITY IN PROFILE UTILIZING SYSTEMS

CROSS REFERENCE TO RELATED APPLICATION(S)

This application claims priority to U.S. Provisional Application No. 61/332,061, filed May 6, 2010, entitled "Systems, methods, and computer readable media for security in profile utilizing systems," which application is incorporated herein by reference, in its entirety, for any purpose.

TECHNICAL FIELD

Embodiments of this invention relate to computer systems and software for providing distributed storage, processing, understanding, characterizing, and security in the collection, federation, persistence, identification, development, analysis, and use of profile information.

BACKGROUND OF THE INVENTION

Current systems for providing content items to users vary in their approach to user information, for example, in their ability to obtain not only user authenticated access but also meaningful information about their users and the extent to which their users control access to and use of their own information, updates, relevant content, licenses, and controlled/protected content.

Some systems simply decide what may be appropriate for or desirable for users based on a single known data point about the user. For example, location based services receive location information from a user's mobile device and identify nearby businesses, gas stations, or ATMs. Other location-relevant information may be provided as well, such as local weather reports. However, the information is selected based only on the user's location. The system has no way of knowing if any of the identified businesses or facts are more relevant for the particular user than any other, such as a password, magnetic strip card, SIM card, IP address, user ID, or DRM code.

Some systems guess what may be appropriate or desirable for users based on a single action. For example, contextual advertising systems may provide an advertisement for a web page based in part on a target word in the web page. These systems have no way of knowing if the advertisement is actually relevant to the user viewing the web page—the advertisement is chosen simply because it matches a target word on the web page. Some systems decide what products may be desirable for a user based on ratings of other similar products provided by the user. For example, some recommendation services receive limited user ratings, or implicit ratings based on views or purchases, of a certain kind of product—books or movies for example—and recommend other books or movies that the user may like based on similarity to items favorably rated, such as authors, themes, actors, directors, genres, and the like. This may yield inappropriate or incorrect recommendations. For example, after buying a single children's book, a recommendation service with limited information may continue to recommend children's genres despite there being no other connection between the user and children.

Presently available digital rights management (DRM) techniques protect and provide access to digital content. DRM systems are generally now based on conventional static key based encryption, where the presence of a particular key in the format selected by the DRM system unlocks access to a single particular digital content piece.

Location based systems, contextual advertising, and recommendation systems, are forced to decide what things may be relevant to them on the basis of the limited known information about a user. These systems may not achieve a high success rate of delivering information that is truly relevant to the user because the recommendations are based on limited available information explicitly shared with the system. The system does not know any other information about the user, including information collected by or shared with other systems. These systems, however, may not allow the user to have control of, or access over their personal information or that of the system. That is, the user has shared only a limited amount of personal information with the system either explicitly or implicitly.

Other systems may make more intelligent recommendations or grant access for users based on more detailed information about the user, but these systems may suffer from user privacy or validation problems. For example, deep packet inspection technologies can analyze information sent to and from a user on a broadband network. By inspecting all information sent or received by a user over time, the broadband service provider can develop a clearer picture of the user and what may be relevant to them. However, this approach raises serious privacy concerns because the user may not know that their personal information is being collected, and does not control to whom the information is provided.

These previous systems also suffer from being proprietary to the particular website, data system, or electronic service accessed. For example, web sites such as Facebook, Amazon, and ESPN, maintain some profile information associated with their users. However, the profile information stored by the user at one site is generally inaccessible to others, depriving the user of its benefit as they travel to other websites. Allowing one site to share information with others again raises privacy concerns. It often may be prohibitive for one system to obtain the appropriately informed user consent to share profile information with another system.

As the use of user profile information to gain access or deliver content and services increases, so too does the risk of unauthorized access to the profile information—either by an unauthorized content holder or an unauthorized service provider mining the profile information, or unauthorized content or service access by a replicated or stolen ID. Further, the risk of corruption or destruction of a user's profile/access credentials information increases as greater amounts of profile information are aggregated in a single location which represents a possible single point of failure for loss of the profile information. The consequences of the loss also increase as users come to rely more and more on systems that make use of the profile information. Further, as sets of users are encrypted or processed in repeatable methods, the risk for entire sets of profiles to be compromised, hacked, or stolen as a set goes up.

DETAILED DESCRIPTION

Certain details are set forth below to provide a sufficient understanding of embodiments of the invention. However, it will be clear to one skilled in the art that embodiments of the invention may be practiced without various of these particular details. In some instances, well-known computer system components, network architectures, physical properties, control signals, and software operations have not been shown in detail in order to avoid unnecessarily obscuring the described embodiments of the invention.

Embodiments of the invention provide a profiling system, network systems, devices, content, computer systems, software, or combinations thereof, that may improve the security of profile information and access, the security and ID of relevant and authorized interactions based on profile information, or all. This may advantageously secure a profiling system that may authorize, obtain, expand, persist for a time, manage, store, federate, loosely associate based on e.g. relevance, merge, index, characterize, and use electronic profiles. Electronic profiles described herein include data structures containing information about an entity, resource, content, or system, all or a portion of which may be used as input to an analysis engine that may take a predictive or deterministic action based in part on the electronic profile. Electronic profiles may be stored in computer readable media, such as but not limited to, any type of computer readable memory. As will be described below, an entity may control the use of all or portions of their electronic profile or electronic profile service or system or software, allowing it to be used in part or completely to score and select content, services, resources, characteristics (including, for example, electronic signatures and other physical properties) or deny access responsive to requests from particular entities or relevance of particular content, services or resources. All or portions of the electronic profile may also be used to secure content or recommendations. For example, use of a particular device outside of a normal pattern as specified by an electronic profile may result in a denial of access to requested content. The analysis engine uses information from the electronic profile to take a predictive or deterministic action, for example, as will be described further below, suggesting or providing access to products, services, content, organizations, people, or other items that may be particularly relevant for the profile owning entity, content, service or resource. The entity may be a person, enterprise, or a group of people. The entity may also be a segment of people that share a common attribute. The entity may also be a thing such as, but not limited to, a product, device, service, place or item of content. Content herein generally refers to any type of stored digital content, including but not limited to data files, images, videos, coupons, offers, and advertisements.

Figure 1:
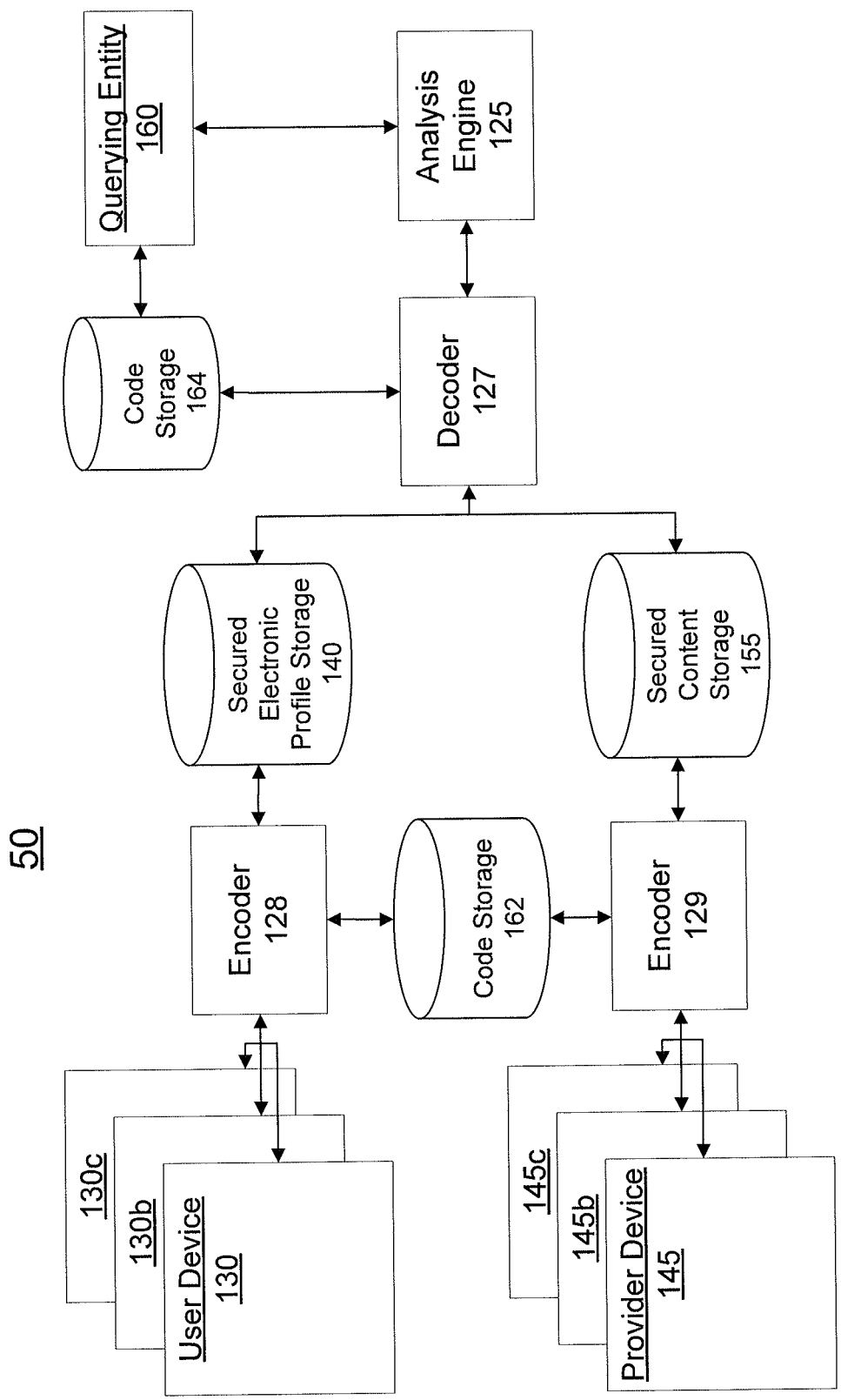
FIG. 1 is a schematic illustration of a system according an embodiment of the present invention.

An example of a system 50 according to an embodiment of the present invention is shown in FIG. 1. The system 50 includes an analysis engine 125 that may respond to a query from a querying entity 160. The analysis engine 125 may be implemented using one or more processing unit(s), such as one or more processors, and memory encoded with computer executable instructions for performing the actions described herein. For example, the querying entity 160 may request content relevant to a particular profile owning entity. The analysis engine 125 may then score or otherwise review accessible content and provide relevant results to the querying entity 160. The scoring may be based on an entity's profile, and the querying entity 160 may not be able to itself access the entity's profile for whom the content is scored. Those relevant results may be used to deliver content or other services to the profile owning entity. Suitable systems for electronic profile development, storage, and use were described in U.S. patent application Ser. No. 12/334,389, filed Dec. 12, 2008 entitled "ELECTRONIC PROFILE DEVELOPMENT, STORAGE, USE, AND SYSTEMS THEREFOR," which application is hereby incorporated by reference in its entirety for any purpose. Embodiments of the present invention may increase security and privacy around the storage or access of content and electronic profiles, and the interaction between profile owning entities and querying entities. Various physical characteristics of one or more devices may be used to secure or validate the content or electronic profiles in the system, as will be described further below.

In an embodiment of the invention, one or more codes may be used to encode electronic profile data, stored content, or both. Moreover, a code may advantageously be generated which is specific to a profile owning entity/querying entity pair, such that only the querying entity may decode the information. Referring back to FIG. 1, codes may be stored in a code storage 162. Although shown as a single code storage unit in FIG. 1, the code storage 162 may include any number of storage devices, as will be described further below. In particular, individual codes may be stored in a distributed manner across multiple devices (for example a user device, provider device, or other device) and/or used in combination to provide unique access. The code storage 162 may be implemented as any type of computer readable media.

Figure 7:
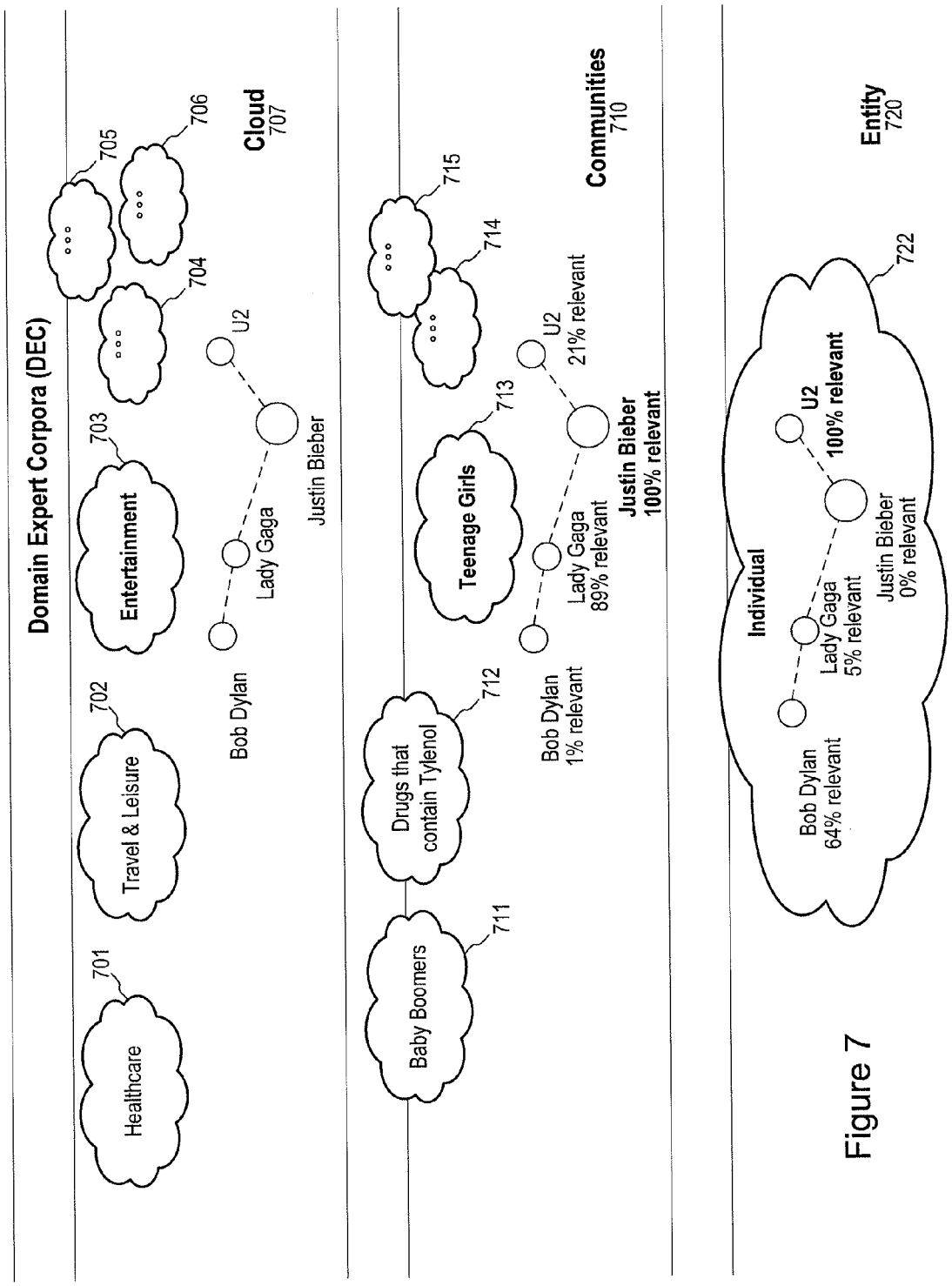
FIG. 7 is a schematic illustration of relevance in accordance with embodiments of the present invention.

Embodiments of the invention may include a neural network, implemented by one or more processing units and memory encoded with instructions for implementing the neural network, that may dynamically update based on learning, and that uses data across the entity's devices and correlating provider device, accessed content, and or other elements to establish secure encoded profile data, including but not limited to the expression of that data not just in the context of the individual but across communities and the cloud (Domain Expert Corpora) of which they are also a member, as will be referenced below in FIG. 7. Accordingly, profile data may be developed based not just on use of one particular device or provider, but aggregated across the use of multiple devices, providers, and situations.

One or more encoders 128 may encode profile information associated with an entity and store encoded profile information in the secured electronic profile storage 140. The encoders 128 may generally be implemented using one or more processing unit(s) and computer readable media encoded with executable instructions for performing the actions described herein. Profile information may include, but is not limited to, context, content use, syntax understanding, content concept understanding, physical properties, software information (such as a license or adapter), or combinations thereof. Again, although shown as a single unit 140 in FIG. 1, the secured electronic profile storage may include any number of storage devices, and in particular, data stored in the secured electronic profile storage may be distributed across multiple devices, as will be described further below. The profile information may be resident on one or more user devices 130, 130*b*, 130*c*. In some embodiments, the specific devices may also have a layer of encryption or other access control such that information from different user devices may have different access restrictions.

One or more encoders 129 may encode content and store encoded content in the secured content storage 155. Again, although shown as a single unit 155 in FIG. 1, the secured content storage may include any number of storage devices, and in particular, data stored in the secured content storage may be distributed across multiple devices, as will be described further below. The content may be resident on one or more provider devices 145, 145b, 145c. In some embodiments, the specific devices may also have a layer of encryption or other access control such that information from different user devices may have different access restrictions.

The query from the querying entity 160 may be specific to an entity, or a group or class of entities. One or more codes stored in the code storage 164 may be used by a decoder 127 to access electronic profile information in the secured electronic profile storage 140, content in the secured content storage 155, or both. The decoder 127 may generally be implemented using one or more processing unit(s) and computer readable media encoded with executable instructions for performing the actions described herein. The processing unit(s) and computer readable media may or may not be shared with the encoders described above. Again, although shown as a single unit 164 in FIG. 1, the code storage 164 may include any number of storage devices, and in particular, data stored in the code storage 164 may be distributed across multiple devices, as will be described further below. In this manner, the information stored in the secured electronic profile storage 140 and secured content storage 155 that is accessible responsive to a query from the querying entity 160 may vary according to the identity of the querying entity 160 and may be controlled through embodiments of security systems described herein. That is, the analysis engine 125 may utilize only profile information in the profile storage 140 and content in the content storage 155 that may be decoded using a code accessible to the querying entity 160 in servicing a query for a particular profile owning entity. In this manner, a profile owning entity may retain control of the terms on which portions of their electronic profile may be accessed.

Embodiments of the present invention provide a mechanism for securing content and interactions of consumers and partners within a system that allows a profile owning entity to create a rich profile based on imagery, explicit and implicit data structured and unstructured related to preference, interests, hobbies, events, music, places, retail purchases, roles, contexts, possessions, locations and social graph, to name a few. Locations may be physical, associative, or virtual. The profile may also be based on implicit behavioral or other profile data that may be resident with a content provider or other partner, for example topics/content of web-pages browsed, themes of text messages sent, derived social data and social graph from emails, instant messaging, text messaging, phone call records, physical characteristics of devices and content, document syntax or content patterns, relative position in social graphs. The system may selectively act on a profile based additionally on a role and intent of the profile owning entity.

In this manner, a consumer may be presented with content from content owners of interest that the analysis engine has determined to be relevant to the consumer's profile as a whole or in part, as defined by permissions that may be controlled by the consumer, including profile information which may be sequestered in private data silos of partners. The partners may advantageously have no or limited visibility into profile information under the entity's ownership and control.

Having described an overview of the operation of an example system shown in FIG. 1, components of the system will now be described in greater detail.

The analysis engine 125 generally includes a processor and memory to store computer readable instructions that may cause the processor to implement the functionalities of the analysis engine described below. The engine 125 may be implemented on a server or other computer or computing device. Although shown as a unitary system, the analysis engine 125 may be implemented as distributed across a plurality of computing devices, with portions of the processing performed by each or some of the devices.

A user device 130, which may be implemented as any device with suitable processing, memory, and communication capabilities to implement the functionalities described herein, is in communication with the encoder 128 and may be in communication with the analysis engine 125. The user device 130 may accordingly be, but is not limited to, a personal computer, kiosk, cell phone, personal digital assistant, car media or navigation system, television set-top box, TV, game device, video player, or music player. The user device 130 may be specific to a single user, or may be used by multiple users, such as in the case of a publicly accessible workstation, kiosk, server farm, service, social network, or private/public cloud computing system. In some embodiments, the user need not be a physical person, but may be a representative of a group of people, or may be another automated process or computer program performing a profile entry functionality. Communication between the encoder 128 or the analysis engine 125 and the user device 130 may occur through any mechanism. In some embodiments, the analysis engine 125 may be implemented completely or partially as a web service that may communicate with the user device 130 over the Internet using http, in either a secure or unsecured manner, as desired. Any number of user devices may be included in the system 50, including the user devices 130b and 130c shown in FIG. 1.

Electronic profiles are stored in the electronic profile storage 140. It is to be understood that electronic profile storage 140 as shown, provides an aggregated view of an electronic profile which may be stored across multiple storage devices. As will be described further below, the electronic profiles may be database structures and accordingly may be stored in a database. However, any type of electronic storage may be used to store electronic profiles and the profiles may be stored in any number of distinct storage locations, and individual profiles may be distributed across a plurality of storage locations, some of which are not traditionally thought of as storage, including but not limited to, upper memory, PROMs, FPGA, SIMs, name chips; any data carriers, reader transmission receiver or storage, machine address, physical characterization, e.g. impedance of a transmission medium, energy properties, etc.. Electronic profiles will be discussed in greater detail below.

A content provider, or other entity seeking to interact with profile owning entities, or systems, may communicate with the encoder 129 and the analysis engine 125 using a provider device 145. As with the user device 130, any device with suitable processing, memory, and communication capabilities may be used. Accordingly, the provider device 145 may be implemented as, but is not limited to, a server computer, personal computer, cell phone, personal digital assistant, kiosk, ATM, store checkout system, POS, vending machine or building entry system. The provider device 145 may communicate with the encoder 129 and analysis engine 125 in any manner, wired or wireless.

The provider device 145 is in communication with secured content storage 155. The secured content storage 155 may be implemented using any suitable electronic memory storage that contains information the provider may want to share with one or more profile owning entities. The secured content may be, but is not limited to, news or entertainment content, such as text files or media files, databases, advertisements, social contacts, entity profiles, customer relationship management information, enterprise resource management information, catalog data, inventory, images, movies, charity information, sports information, intellectual property, software code, healthcare records, genomic data, or combinations of these types of information. Any number of provider devices may be included in the system 50 including the provider devices 145b and 145c. The additional provider devices may have their own associated content storage, or may be in communication with the secured content storage 155.

The analysis engine 125 may score content items based on accessible portions of one or more of the electronic profiles stored in secured electronic profile storage 140. The output of this process may be provided in a variety of ways, including numerical scores assigned to content in the secured content storage 155 based on its relevance to the portions of the electronic profile or profiles consulted, or a ranked list of content in the secured content storage 155 listed in ascending or descending relevance order, or an indication of content items having a relevance score above or below a threshold relevance score. In some examples, the analysis engine 125 may score content items by computing a value based in least in part on an encoded electronic profile. In some examples, permission thresholds may be passed, or content abstraction or filtering may be executed based on score. For example, in one embodiment, an R rated movie may be edited or reduced to a PG-13 by removing tagged or understood inappropriate content.

Embodiments of the encoders 128, 129, decoder 127, and codes are now described. As described above, codes may advantageously be generated specific to a profile owning entity/querying entity pair. The codes may be specific to an individual pair, or classes of pairings (such as all corporate affiliates or subsidiaries of a querying entity having a same code for a particular profile owning entity).

The encoders 128, 129 and decoder 127 may generally be implemented in hardware, software, or combinations thereof. In some examples, one or more communications devices may be configured to implement the functions of the encoders and decoders described herein. That is, one or more communications devices may be configured to implement communication protocols or transmission methodologies that serve the encoding and/or decoding functions described herein. The encoders 128, 129 and decoder 127 may be implemented using respective processors and memory encoded with computer readable instructions causing the encoders and decoder to perform the described functions. The encoder 128 may be implemented in all or in part by the user devices 130, or the encoder 128 may be implemented as an independent processing unit. Similarly, the encoder 129 may be implemented by the provider device 145, or may be implemented as an independent processing unit. Although a single encoder 128 and encoder 129 are shown in FIG. 1, any number may be used. Similarly, the decoder 127 may be implemented by the analysis engine 125 or the querying entity 160 or may be an independent processing unit. Although a single decoder 127 is shown in FIG. 1, any number may be used.

The encoders 128, 129 and decoder 127 may implement any suitable encryption/decryption or other access control mechanism, as described herein. The mechanism may be static, but in many examples may be dynamic. That is the mechanism used to encode or decode profile information, content, or both, may change over time or context. In one example, the encoders encrypt data using an encryption key that is based all or in part on a code stored in the code storage 162. The decoder 127 may then decrypt data based all or in part on a code stored in the code storage 164. Generally, the encryption and decryption operations are selected such that the forward and backward operations are commutative (order-independent) and decryption without knowledge of the key is an exponentially hard process. One example of a suitable encryption/decryption methodology would be to express encryption keys as a set of linear matrix operations for which a forward (encryption, such as matrix multiply) transformation is linear in time, while the reverse (decryption, such as matrix inversion) problem is NP-hard, that is it scales exponentially in computation time by the size of the matrix. In other examples, the decryption and encryption procedures implemented by the encoders 128, 129 and decoder 127 may be conducted in other functional forms involving both linear and non-linear mathematics in Euclidean and curvilinear coordinate systems.

One example of an encryption transformation that may be implemented by the encoder 128 is a compound encryption transformation, T given by $$T=DUP$$

That is, a first matrix D may be specific to a particular user device, such as the user device 130 of FIG. 1. D may contain seeded transformations based on, for example, term frequencies of terms used in text messages or other messages on the user device and/or numbers commonly called from the user device and/or cell ids of a number of most common locations in which the user device is used. Physical characteristics as will be described further below, such as electromagnetic signature or keystroke response, may also be used to seed transformations for the matrix D. A second matrix U may be specific to a particular user or other profile owning entity. U may contain seeded transformation terms derived, for example, from potentially dynamic user profile attribute items, like location or determined or stated current role, and/or any partners with whom the user is connected. A third matrix P may be specific to a particular content provider or querying entity. P may contain seeded transformations based on, for example, a transaction volume and/or type between a partner and a user. In this manner, the secured electronic profile storage 140 may contain electronic profiles encrypted in accordance with a profile owning entity/querying entity combination.

The decoder 127 may then implement an inverse transformation $(DUP)^{-1}$ to access the stored secured electronic profile storage 140. Portions of an electronic profile that are able to be decrypted according to the operations implemented by the decoder 127 may then be used to identify relevant content, code, devices, services, resources, entities or otherwise take deterministic action.

The transformation example provided above employs linear algebra in a Euclidean geometry. However, in other examples of the present invention other types of transformations may be used, including for example, leveraging tensor algebra in high-dimensional non-Euclidean spaces.

Codes stored in the code storage 162 and may be generated in a variety of ways, including using standard encryption key generation techniques in cases where the codes correspond to encryption keys. In many examples, codes are used that are based all or in part on information obtained from the profile owning entity/querying partner pair to which the code pertains. In many examples, a compound code may be used that is based on several such data elements in combination, of which some or all may be dynamic. The information used to generate a code may generally be any information related to the profile owning entity, querying partner, or their respective devices. For example a physical characteristic may be utilized to generate a code. GPS location information, temperature, electromagnetic signatures of particular devices, file storage location, file types accessed by an entity, and signal-to-noise properties of a communication link, impedance, or resistance of a connection, cable or wire dimension or other property, are all examples of physical characteristics that may be utilized to generate a code.

That is, in some examples, in the case of the use of electronic user or provider devices, it may be possible to uniquely characterize a particular device using one or more physical characteristics in a number of ways, including electromagnetic radiation signature, component signatures, the characteristic impedance and noise-color of a given wired or wireless access port to the device, light radiation from the screen, key-stroke responses, cable or wire dimensions, and others. Aspects of the invention may use these and other components of user or provider devices in various ways. In some examples, these physical characteristics may be used to dynamically compute components of the (generally hyperdimensional curvilinear tensor-described) encryption/decryption transformations for the device, such that information from the device may only be determined by systems that have previously characterized the device. In some examples, one or more physical characteristics may be used as factors of authentication or identity of both the device and the user of the device or other entity associated with the device. In some examples, knowledge of the forward or reverse (encryption/decryption) transformations may be incomplete, resulting in a probabilistic outcome to the encoding or decoding process delivered by or to the device.

Note that these pieces of information may change over time, yielding a dynamic code that may change with the actions or properties of a particular profile owning entity. Such a code may be viewed as a fingerprint of a particular profile owning entity. The information used to generate the code may be obtained, by measuring the particular property or otherwise accessing the information. The information itself may be used as all or a portion of the code, or the information may be used to seed a particular code generating mechanism, such as a traditional encryption key generator. In this manner, codes may be used which are relevant to the particular profile owning entity and querying entity.

Having described an overview of an example of a system 50 according to the present invention, examples of electronic profiles will now be discussed. Examples of electronic profiles are also described in U.S. patent application Ser. No. 12/334,389, filed Dec. 12, 2008 entitled "ELECTRONIC PROFILE DEVELOPMENT, STORAGE, USE, AND SYSTEMS THEREFOR," which application is hereby incorporated by reference in its entirety for any purpose. The electronic profiles described are exemplary only, and other profile structures may also be used with the security systems described herein. Electronic profiles described herein include data structures containing information about an entity, all or a portion of which may be used as input to an analysis engine that may take a predictive or deterministic action based in part on the electronic profile. For example, recall electronic profiles may be encoded and stored in the secured electronic profile storage 140 and used by the analysis engine 125 to identify content that may be relevant to the entity associated with the electronic profile.

Figure 2:
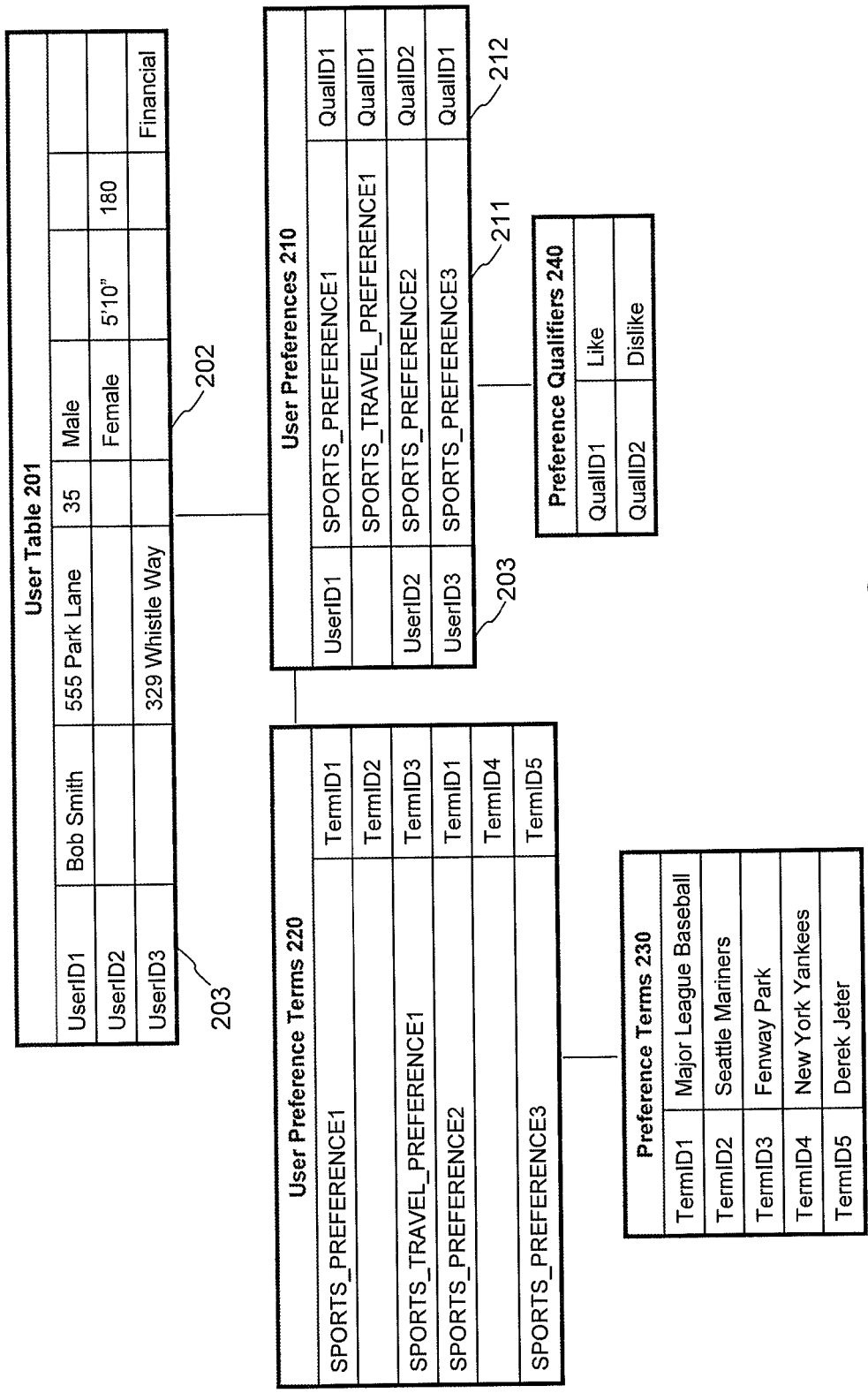
FIG. 2 is a schematic illustration of an electronic profile according to an embodiment of the present invention.

Examples of electronic profiles accordingly include data structures. Any type of data structure may be used that may store the electronic profile information described below. In one embodiment, the electronic profile is stored in a relational database. FIG. 2 illustrates a portion of a conceptual database schema 200 for an electronic profile according to an embodiment of the present invention. The database schema 200 is organized as a star schema, but other organizations may be employed in other embodiments. The schema 200 includes several tables relating aspects of the electronic profile to one another that provide information about the entity owning the electronic profile. The database constructed according to the schema 200 may be stored on generally any suitable electronic storage medium. In some embodiments, portions of an electronic profile may be distributed amongst several electronic storage media, including among storage media associated with different electronic devices used by an entity.

Information stored in an electronic profile about an entity may include, but is not limited to any combination of the following: data, preferences, possessions, social connections, images, permissions, recommendation preferences, location, role and context, associative or differential Hebbian weightings (see, e.g., FIG. 7), genetic information, biomechanical information, including, for example, typing rhythm, fingerprint, or iris information. These aspects of an entity may be used in any combination by an analysis engine to take predictive or deterministic action as generally described above, and may be used to seed code generation or transformation mechanisms. Examples of aspects of profile information included in the electronic profile 200 will now be described further.

The electronic profile represented by the schema 200 includes data about an entity in a user table 201. While the term 'user' is used in FIG. 2 to describe tables and other aspects of the profile, the term is not meant to restrict profiles to individuals or human representatives. The information contained in an electronic profile is generally information about an entity associated with the electronic profile, which may also be referred to as the entity owning the electronic profile. The entity may be a person, a group of people or a class of data, for example. The entity may also be a segment of people that share a common attribute. The entity may also be a thing such as, but not limited to, a product, place, business, application, system, or item of content. The entity may be a segment of things that share a common attribute. The term 'user' in FIG. 2 simply refers to the entity associated with the profile.

Data 202 about the entity stored in the user table 201. The table 201 may include a column for each type of data. For example, data associated with UserID1 includes name ('Bob Smith'), address (555 Park Lane), age (35), and gender (Male) of the entity. Data associated with UserID2 includes height (5' 10"), weight (180), and gender (Female). Data associated with UserID2 includes financial information and an address (329 Whistle Way). Data about an entity stored in the user table 201 may generally include factual or demographic information such as, but not limited to, height, address, clothing sizes, device characteristics, physical characteristics, such as home cable impedance, contact information, financial information, credit card number, ethnicity, weight, and gender. Any combination of data types may be stored. The user table 201 also includes a user ID 203. The user ID may be generated by a system generating or using the electronic profile, or may be associated with or identical to a user ID already owned by the profile owning entity, such as an email account or other existing account of the entity. Each entity having an electronic profile may have a corresponding user table, such as the user table 201, encoded and stored in the secure electronic profile storage 140 of FIG. 1. An association between the userID and the identifier of the profile-owning entity, for example, an email address, may be protected using embodiments of the encryption/decryption described herein.

Preferences of an entity may also be stored in the entity's electronic profile. Preferences generally refer to subjective associations between the entity and various words that may represent things, people, or groups. Preferences may also be referred to as attributes of an electronic profile. Each preference of an individual represents that association—"I like cats," for example, may be one preference. Preferences may be stored in any suitable manner. In the schema of FIG. 2, preferences are stored by use of the user preferences table 210, the user preference terms table 220, the preference terms table 230, and the preference qualifiers table 240, which will be described further below. The four tables used to represent preference in FIG. 2 are exemplary only, and preferences may be stored in other ways in other embodiments such that a profile owning entity is associated with their preferences.

Referring again to FIG. 2, the user table 201 of an entity is associated with a user preferences table 210. The user preferences table 210 includes userIDs 203 of entities having profiles in the secure electronic profile storage 140 and lists individual preference IDs 211 associated with each userID. For example, the UserID1 is associated with SPORTS-PREFERENCE1 and SPORTS_TRAVEL_PREFERENCE1 in the example shown in FIG. 2. Although shown as including only a few user IDs 203, the user preferences table 210 may generally include a list of multiple user IDs known to the profiling system and a list of individual preference IDs associated with the userIDs. In this manner, an entity's preferences may be associated with the data related to the entity. Generally, any string may be used to represent a preference ID. Also included in the user preference table 210 are qualifier IDs 212 that are used to record an association with terms contained in the preference. The qualifiers will be discussed further below.

Each preference ID has an associated entry in a user preference terms table 220. The user preference terms table 220 contains a list of term IDs associated with each user preference ID. In FIG. 2, for example, the preference ID SPORTS_PREFERENCE1 is shown associated with TermID1 and TermID2. Any string may generally be used to represent the term IDs. Each TermID in turn is associated with an entry in a preference term table 230. The preference term table 230 lists the actual terms represented by the TermID. A term may generally be any string and is generally a unit of meaning, which may be one or more words, or other representation. As shown in FIG. 2, the preference terms table 230 indicates the TermID1 is associated with the term Major League Baseball. Although only one term is shown associated with the TermID1, any number of terms may be so associated.

Accordingly, as described above, an entity may be associated with preferences that ultimately contain one or more terms. However, the relationship between the entity and the terms has not yet been described. An entity's preferences may include a scale of likes, dislikes, or both of the entity. Further an entity's preferences may include information about what the entity is or is not, does or does not do in certain circumstances. In the schema 200 of FIG. 2, each preference may be associated with one or more qualifiers, as indicated by an association between the preference ID and a qualifier ID in the user preferences table 210. A term associated with each qualifier ID is then stored in a preference qualifiers table 240. Qualifiers describe the relationship of the preference terms to the profile owning entity. Examples of qualifiers include 'like' and 'dislike' to describe a positive or negative association with a preference, respectively. Other qualifiers may be used including 'when', 'when not', 'never', 'always', 'does', 'does not', 'is', and 'is not' to make more complex associations between preference words and the profile owning entity. As shown in FIG. 2, the qualifier QualID1 represents the association 'like' and, QualID2 represents the association 'dislike'.

Accordingly, the structure shown in FIG. 2 encodes two preferences for an entity represented by UserID1. SPORTS_PREFERENCE1 indicates UserID1 likes Major League Baseball and the Seattle Mariners. SPORTS_PREFERENCE2 indicates UserID1 likes Fenway Park. Similarly, UserID2 has SPORTS_PREFERENCE2, which indicates UserID2 dislikes Major League Baseball and the New York Yankees. UserID3 has SPORTS_PREFERENCE3, which indicates UserID3 likes Derek Jeter.

The manner of storing preferences using the tables described in FIG. 2 may aid in efficient storage and analysis by allowing, for example, multiple termIDs to be associated with multiple user preference IDs without requiring storing the individual terms multiple times in the profile storage 140 of FIG. 1. Instead, multiple associations may be made between the termID and multiple user preferences. However, as discussed, generally, any data structure may be used to encode an electronic profile of an entity. In some embodiments, a profile may be represented and optionally stored as a vector, matrix, tensor or index. The vector may uniquely identify an entity associated with the profile. For example, the profile vector may represent a plurality of axes, each axis representing a term, word, or user device, and the vector include bits associated with each term, word, and user device to be included in the profile. The preferences may be used to develop matrices for transformations, examples of which have been described above. For example, device-specific elements of the user profile may be used to develop the tensor transformation matrix D for a transformation as described above. The matrix U described above may include one or more dynamic aspects of an entity, such as, for example, location. The matrix P described above may include one or more aspects of a provider profile. Note that in the transformation example described above, these three elements—device aspects, dynamic entity aspects, and provider aspects, may be used in combination to perform encryption/decryption operations.

Further information regarding an entity may be stored in an entity's electronic profile including possessions, images, social connections, permissions, recommendation preferences, location, roles, and context. Although not shown in FIG. 2, these further aspects may be stored as additional star tables associated with the central user table 201 or as other dimensions in a vector or tensor index structure. Possessions of the entity may include things the entity owns or has access to including, but not limited to, gaming systems, cell phones, computers, cars, clothes, bank or other accounts, subscriptions, service connections, ratings and recommendations, and cable or other service providers.

Social connections of the entity may include, but are not limited to, connections to communities, standing on rankings, affiliations, subscriptions, friends, family, neighbors, co-workers, organizations, membership programs, information about the entity's participation in social networks such as Facebook, Myspace, or LinkedIn, or businesses an entity is affiliated with.

Permissions for accessing all or a portion of the electronic profile may include an indication of when an entity's profile information may be used or which entities may access portions of the profile. As has been described above, these permissions may be implemented by the generation of codes, which may be dynamic codes. A querying entity may only make use of portions of the electronic profile which it is able to successfully decode or provide a code that may be used to decode or otherwise access the profile portions. For example, an entity may authorize their profile information to be used by the profiling system responsive only to requests from certain entities, and not responsive to requests from other entities or at varying times, locations, or combinations thereof. The permissions, or encoding/decoding procedures may then dictate when, how, how often, or where the profiling system may access the entity's profile responsive to a request from a specific entity, or type of entity. For example, an entity may specify that sports websites may obtain information about content relevant to the entity's profile, but that banks may not. In the manner described above, then, even the analysis engine 125 may only be able to access certain content or profile information when it is provided with appropriate decoding information. Electronic profile information may thus be advantageously protected by a profile owning entity and exposed only as specified by the profile owning entity in either a specific or anonymous way.

Similarly, an electronic profile may be used to pull relevant content onto a device. Content providers may make content available, and based on the permission settings and evaluation by the analysis engine, appropriate, authenticated content may be pulled onto one or more devices of relevant entities. In this manner, a continuous stream of authenticated, relevant information may be provided to end user devices.

In some examples, the electronic profile may be consulted by the analysis engine 125 to determine if a particular item or class of content is appropriate for one or more entities. For example, the profile may be used to screen out child-protected content, SPAM email, or other types of filtering operations as content is evaluated against the profile. In some examples, attributes of an electronic profile may be consulted by the analysis engine 125 to establish whether a given item of Internet content is appropriate to access for the owner of any attributes of the electronic profile. Such attributes of the electronic profile may include, for example, data classes, age, gender, role, demographic segment, socio economic segment, psychographic segment, and other attributes. In some examples, the analysis engine 125 may evaluate the electronic profile against a content to arrive at a value, which may be the same or different as a relevance score as described herein. A threshold on the value may be stored in computer readable media accessible to the analysis engine 125 and may be used to determine if the content may be delivered to an entity. For example, a piece of content may be a coupon or other offer, and the coupon may be evaluated by the analysis engine 125 against an entity's profile to determine a value of the coupon to an entity or inversely the value of the entity to the coupon's issuer or to the offer. If the value is over a threshold, the coupon or offer may be delivered to the entity. The delivery may occur, for example by electronic communication from a provider device to a user device. In some examples, delivery may occur by the analysis engine to the user device. Other delivery modalities may also be used.

Recommendation preferences may include whether the entity would like or accept recommendations for additional information to be added to their electronic profile, or for data or possessions. The recommendation preferences may specify which entities may make recommendations for the electronic profile owning entity and under what conditions.

Location information of the entity may include a current location determined in a variety of levels of granularity such as, but not limited to, GPS coordinate, country, state, city, region, store name, church, hotel, restaurant, airport, other venue, street address, or virtual location or a historical continuous signature of location. In some embodiments location information may be obtained by analyzing an IP address associated with an entity or MAC address, or EMS or ENS, or combinations thereof.

Roles of the entity may include categorizations of the entity's relationships to others or things including, but not limited to, father, mother, daughter, son, friend, worker, brother, sister, sports fan, movie fan, wholesaler, distributor, retailer, and virtual persona (such as in a gaming environment or other site) and data types or classes.

Context of the entity may include an indication of activities or modes of operation of the entity, including what the entity is doing on their own or with other identifiable entities, in the past, present, or future, such as shopping, searching, working, driving, or processes the entity is engaged in such as purchasing a vacation.

All or a portion of the electronic profile may be used as an input to the analysis engine. In some embodiments, there may be insufficient data about an individual to have a meaningful output of the analysis engine based on their electronic profile. Accordingly, in some embodiments the profile of a segment sharing one or more common attributes with the individual may be used as input to the analysis engine instead of or in addition to the individual's profile. The profile of a segment may also be used to select content that may be relevant for that segment of entities, and pass content to entities that share one or more attributes with the segment. In some examples, missing values may be inferred using other mechanisms that may be specific to a user or group. Examples of inferring values are described, for example, in U.S. Ser. No. 12/636,630, filed Dec. 11, 2009 entitled "Providing recommendations using information determined for domains of interest," which application is hereby incorporated by reference in its entirety for any purpose.

Examples of codes and methods useable in embodiments of the present invention for encrypting or otherwise controlling access to electronic profile information or content have been described above. As discussed above, the storage of codes may be distributed across multiple devices or access web or other system. Examples of distributed storage for codes, electronic profile information, or other content will now be described. Distributed storage may advantageously enable redundancy and recovery of the distributed content, profile, or code in the event of the loss or failure of a particular device, desired remote access to replicated content (such as, for example, a movie or music file).

One mechanism for achieving distributed storage employs a distributed hash table. Data to be distributed may be federated across a network of any number of storage systems, and looked up rapidly across nodes while tolerating failures through propagation delays in look-up. Each node in the table includes a portion of the data and a pointer to one or more locations which contain a next portion of the data.

Figure 3:
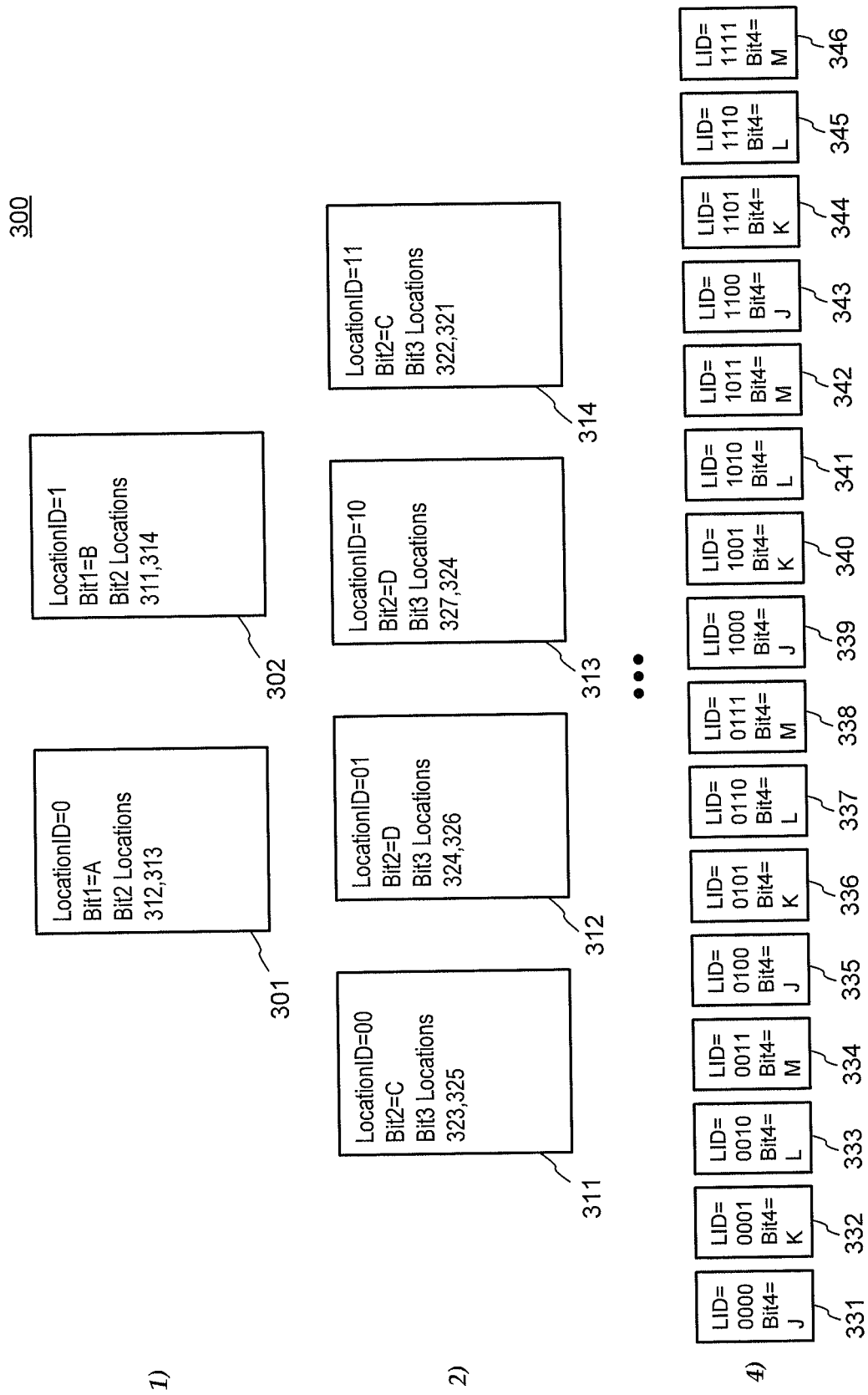
FIG. 3 is a schematic illustration of a distributed hash table according to an embodiment of the present invention.

FIG. 3 is a conceptual illustration of a distributed hash table 300. The hash table 300 may facilitate incremental, distributed, and redundant storage and recursive recall. The distributed hash table 300 illustrates profile information symbols A,B,C,D, . . . ,J,K,L,M stored in a redundant hashing tree. The symbols A→M may represent portions of an electronic profile, for example. A symbol may be implemented as a single bit, or multiple bits. A symbol may also represent a conceptual portion of an electronic profile, such as a single preference or profile attribute. In other examples, the symbols may represent portions of a code, such as an encryption key.

Referring to FIG. 3, a number of boxes are shown, each representing a storage element. Each storage element represents a portion of an electronic storage device. The storage elements may be spread across a number of storage devices, as will be described further below, and some of the storage elements may be located on a same electronic storage device. A first level of the distributed hash table 300 includes storage elements 301 and 302, respectively. Storage element 301 corresponds to the LocationID of 0 and contains Bit1, which is the symbol A, and a pointer to two locations of Bit2, locations 312 and 313. Storage element 302 corresponds to the LocationID of 1 and contains Bit1 of another profile element, code, or content. In this case, Bit1 is B, and a pointer to the locations of Bit2, locations 311 and 314. By storing each portion of the distributed data in two locations, some redundancy is provided. In other examples, redundancy may not be provided in this manner, and only a single location may be pointed to. In other examples, each bit may be stored in more than two locations.

The next level of the distributed hash table 300 represents the storage elements storing Bit2 for the data represented by the table. Since each portion is stored in two locations and the hash table 300 represents a storage map for two data entries, there are four storage elements shown in level 2—storage elements 311-314. Each corresponds to a particular LocationID and contains a pointer to two locations storing the respective Bit3. The third level of the hash table 300 is omitted from FIG. 3 for brevity, but the fourth level is shown illustrating the storage elements 331-346 storing Bit4. In this example, the data are four bits long, accordingly the fourth level is the last level in the hash table 300. In other examples, data of any length may be stored and distributed in this manner. While each storage element in FIG. 3 is depicted as storing a bit, in other examples, each storage element may correspond to a portion of a data entry, which may be longer than a single bit, as generally described above.

The physical locations of the storage elements shown in FIG. 3 may be distributed across distinct units of hardware. The complete hash table 300 of FIG. 3 would include 30 storage elements (including the third layer which is not shown in FIG. 3). Accordingly, in one embodiment, 30 different storage devices may be used to implement the distributed storage, with each storage device containing a single storage element of the hash table. However, in other examples, a smaller number of devices may be used. When a smaller number of devices are used, in some examples, no common bits from a same data entry, such as a same profile, code, or content file, are stored on the same storage device. In such a case, the number of distinct devices may be at least double the number of symbols in the code or profile such that a minimum of two completely independent copies of the stored information exist at any time.

Figure 4:
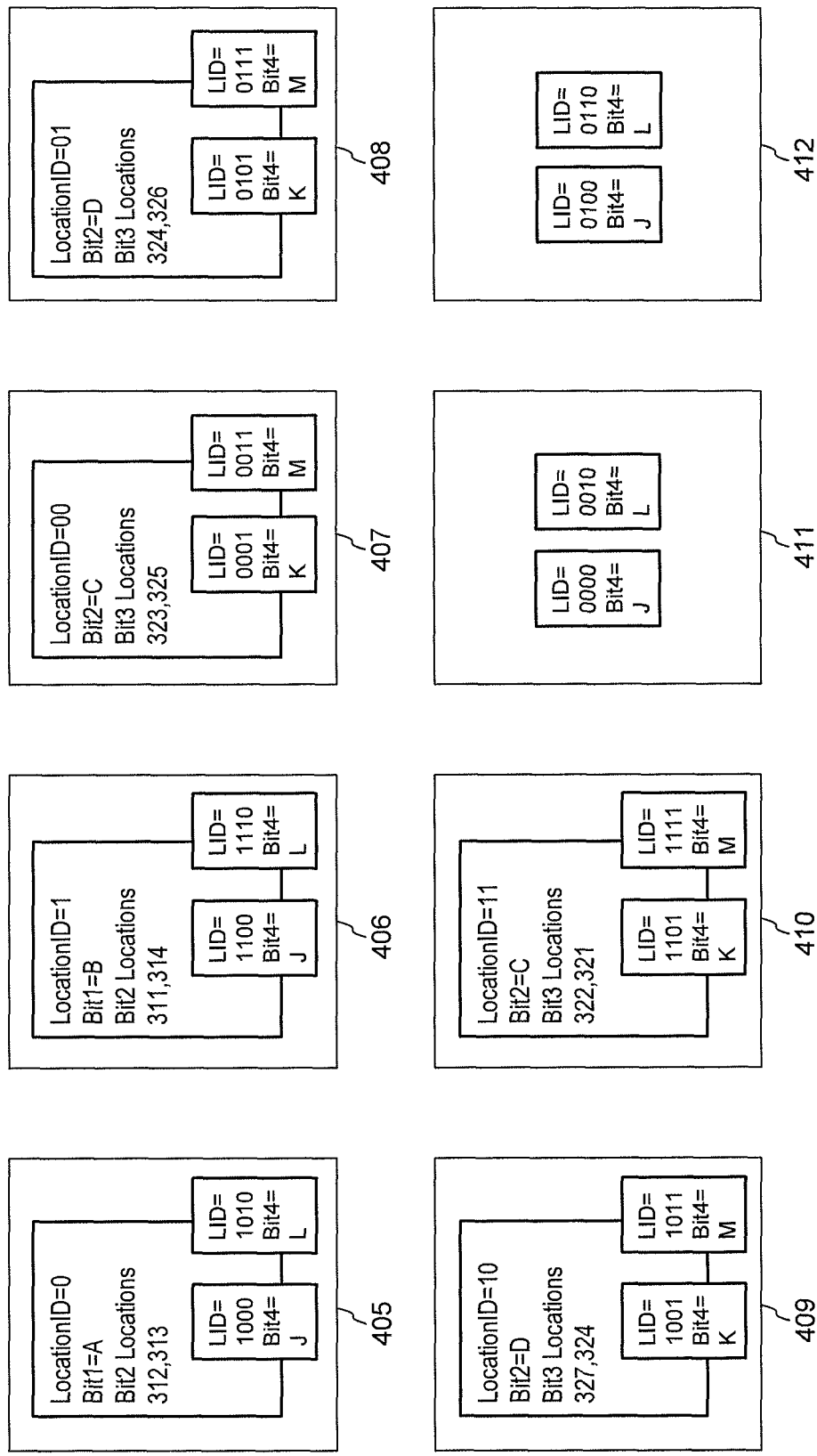
FIG. 4 is a schematic illustration of a distributed storage system according to an embodiment of the present invention.

FIG. 4 is a schematic illustration of the storage elements of FIG. 3 distributed across multiple physical storage devices. The storage devices 405-412 are shown in FIG. 4. Storage device 405 contains storage elements 301, 339, and 341. Storage device 406 includes storage elements 302, 343, and 345. Storage device 407 includes storage elements 311, 332, and 334. Storage device 408 includes storage elements 312, 336, and 338. Storage device 409 includes storage elements 313, 340, and 342. Storage device 410 includes storage elements 314, 344, and 346. Storage device 411 includes storage elements 331 and 333. Storage device 412 includes storage elements 335 and 337. In this manner, data security and redundancy may be improved. Additionally, electronic profiles, codes, or content may be distributed across multiple devices. Referring back to FIG. 1, any of the user devices 130, 130b, 130c, or provider devices 140, 140b, 140c may be used as any of the storage devices 405-412. As a result, different devices in the system 50 of FIG. 1 may be used to implement distributed storage of electronic profiles, codes, content, or combinations thereof. Furthermore, all or portions of the secured profile storage 140, secured content storage 155, code storage 162, and code storage 164 may be implemented using the distributed storage methodologies described above. That is, each of the storage locations 140, 155, 162, and 164 depicted in FIG. 1 may represent a plurality of storage elements distributed across multiple physical storage devices, including the user or provider devices, or both.

Referring back to FIGS. 3 and 4, in some examples the LocationIDs of the storage elements may themselves be encoded using a security methodology described above. That is, the locationIDs of next storage elements themselves may require the use of one or more correct codes to decode the locations. This may provide yet another layer of security in recovering a stored code, profile, or content.

As has been described above, the codes used in embodiments of the present invention may be dynamic. Accordingly, distributed hash tables, such as the table 300 of FIG. 3, may be updated and synchronized to support accurate retrieval of the distributed data. Greater redundancy may be used when communication between distributed nodes may be unreliable in terms of uptime, latency, or both. Further, storage elements may be dynamically reassigned to be local to one another and improve the performance of the hash table.

Examples of the present invention may be used to authenticate users to one or more systems. That is, information stored in an electronic profile may be used to provide a confidence level that an entity taking an action corresponds with a particular user. This may allow, an individual to establish their identity to an appropriate confidence level without in some examples requiring a separate logon or authentication act on behalf of the user. Both the user and the entity requiring or requesting the authentication may specify the attributes needed for authentication, the attributes which may be shared to authenticate, and the confidence level required. For example, a confidence level to identify a user may be lower to access a social networking website than to identify the user to their bank. Furthermore, the authentication procedure may not be static, but may dynamically change based on the actions of the user (for example, an authentication may ask whether a user is at an expected or appropriate place at an expected time with an expected device).

Figure 5:
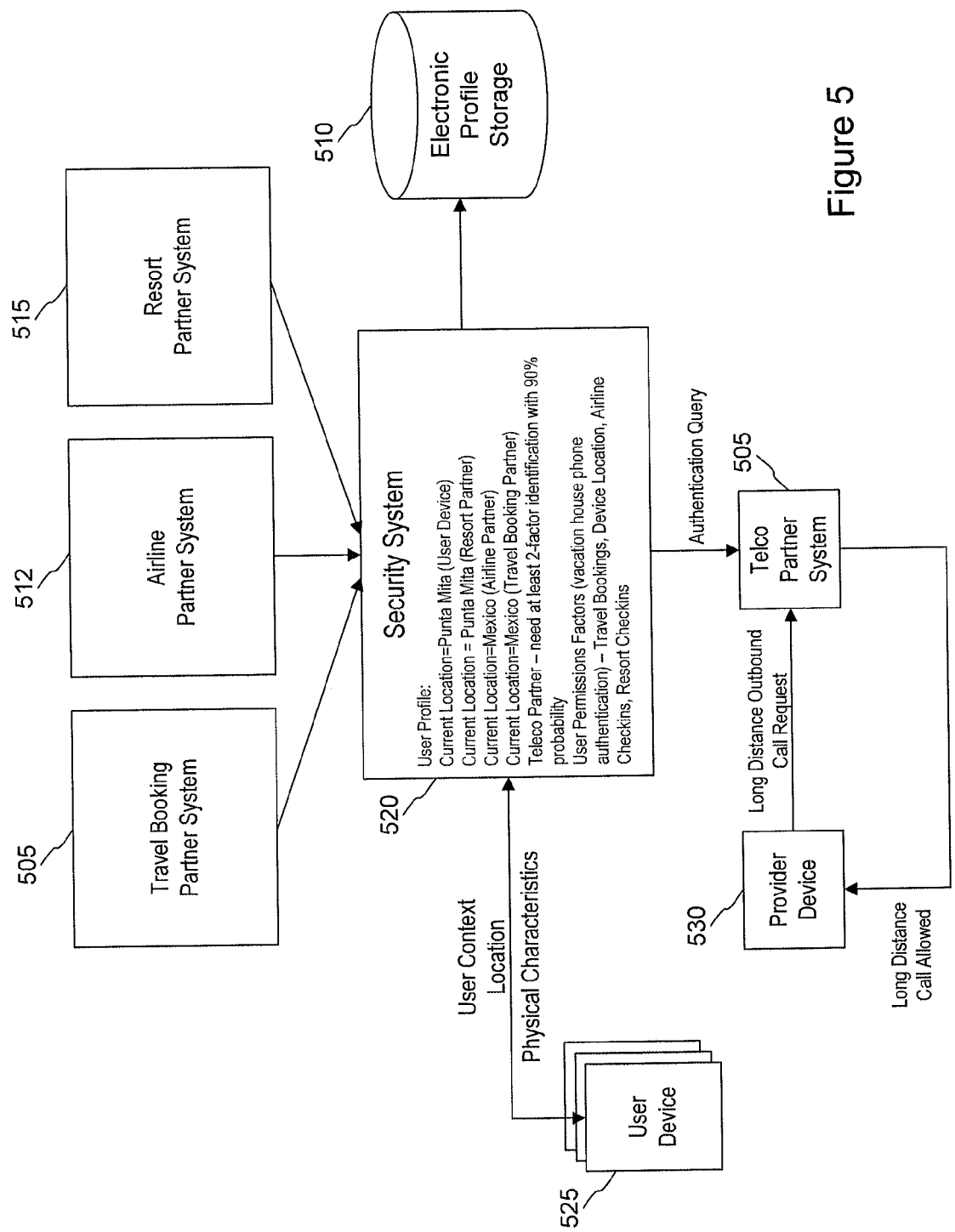
FIG. 5 is a schematic illustration of a system according to an embodiment of the present invention.

An example of this type of transparent authentication will now be described with reference to the schematic diagram of an embodiment of the present invention in FIG. 5. A user may have a block on record with a telephone company for long distance at a vacation home while the user is not there. When the user plans to go to the vacation home, however, they may make their travel reservations through a travel partner website or other travel booking partner system 505. The dates of their travel plans may be stored to their electronic profile, described above, which may be stored in electronic profile storage 510. An airline partner system 512 may record information in the user's profile related to their check-in for a flight to the vacation home. The user may also, for example, check in at a resort associated with their vacation home, or make use of services in the vicinity of the vacation home, which may also be stored to their electronic profile in the electronic profile storage 510 by a resort partner system 515. To interact with the electronic profile storage, the travel booking partner system 505, airline partner system 512, and resort partner system 515 may communicate with a security system 520. The security system 520 may facilitate storage into the electronic profile storage 510, and may be implemented using one or more processing devices and computer readable media encoded with executable instructions for performing the actions described herein.

Once the user arrives at the vacation home, the user may try to use a user device or credit card 525, such as the phone having a long distance call block. The user device 525 may accordingly make a request of a provider device 530 (such as a component of the phone company's telephony infrastructure) to make a long distance call. The provider device 530 may itself query the security system 520, or may query the security system 520 through a telco partner system 535. The query may request access to information the telco partner system 535 may require to authenticate the user. The security system 520 may access the requested information in the electronic profile storage 510 if the user has allowed for access to the requested profile portions by that partner, in some examples. The phone or credit card company may be able to authenticate the user on the basis of the above activity stored in the electronic profile. In this manner, the user may not need to take any further action to authenticate themselves to the phone or credit card company or remove the block on the phone or credit card. In some examples, however, the initial authentication may result in a prompting by the phone or credit card company to the user for any other identification factors required.

Similarly, the user at the vacation home may try to use the same or another user device, such as a set-top box or media player, to access DRM-protected content. The user may have previously obtained rights to the DRM-protected content at another location, such as by purchasing the content at home, or a hotel room. An indication of the user's rights to the content may be stored in an electronic profile associated with the user. Note that the license may be virtually acquired by the user, and an indication of the rights electronically stored in an electronic profile associated with the user. In this manner, the rights (such as a license) and the indication of the rights may be separately stored and independent of the physical location or presence of the DRM-protected content itself. On requesting access to the DRM content (generally any copy of the DRM content in some examples) at the vacation home, the user device may make a request of the provider device 530, or other provider device (such as a component of the media provider's infrastructure) to access the DRM-protected content. The provider device 530 may query the security system 520 directly or through a partner system. The media provider may be able to authenticate the user on the basis of the above-described activity, or other activity stored in the electronic profile. Following authentication of the user, the user may obtain access to the DRM-protected content, even if it is not the same copy of the content that the user originally purchased at home. In some examples, the initial authentication may then prompt the user to further authenticate themselves. In this manner, also, a user may authenticate themselves to and obtain access to DRM-protected content that may be stored on one or more backup systems. So, if a user has an indication of rights stored in their electronic profile, they may obtain access to copies of that DRM-protected content stored in any number of places other than the location where the DRM-protected content was first purchased or licensed, such as a copy stored in a backup or other system.

Figure 6:
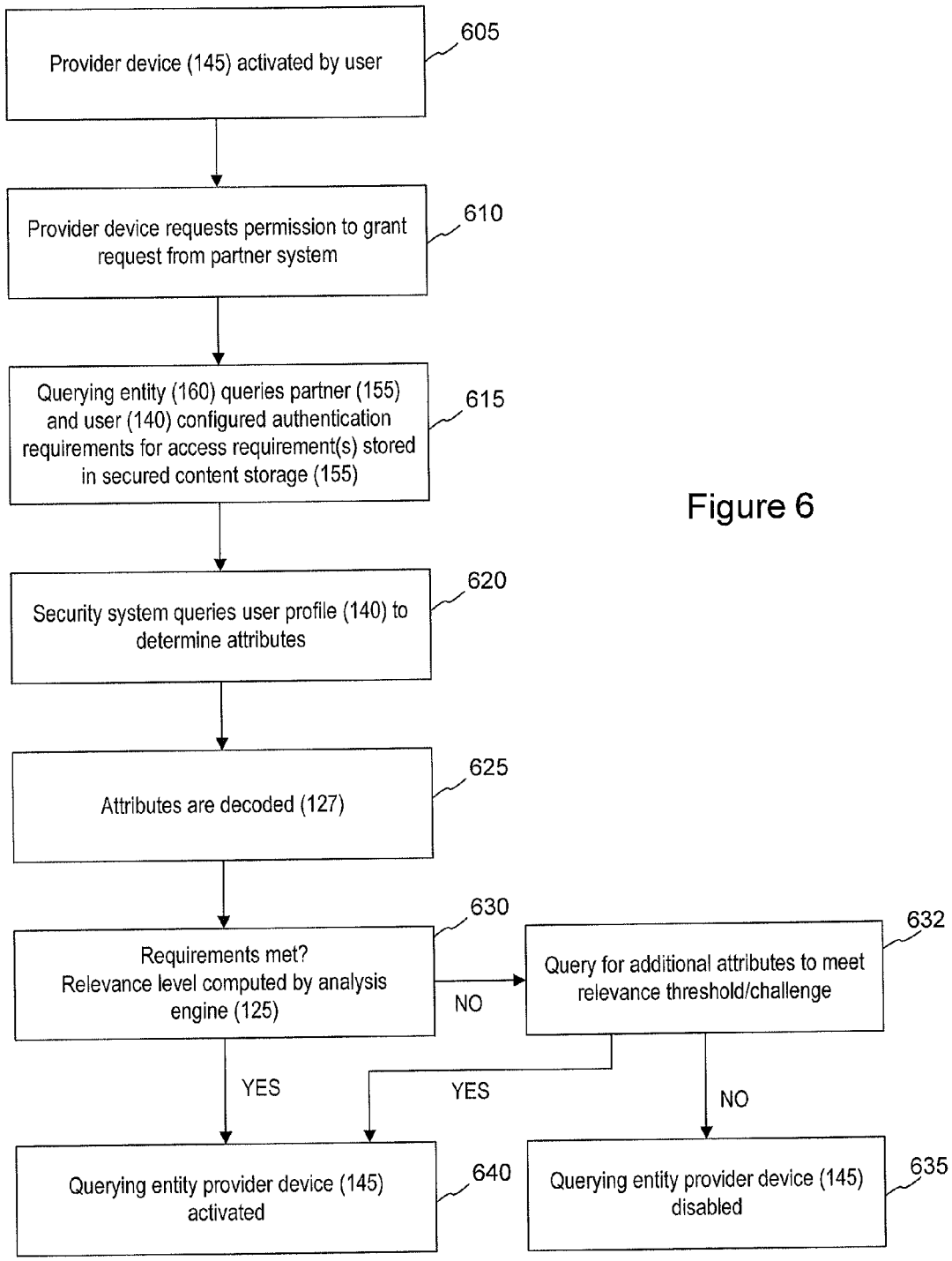
FIG. 6 is a flow diagram arranged in accordance with an embodiment of the present invention.

FIG. 6 is a flow diagram illustrating an example of an authentication method according to the present invention, which will now be described with reference to the system of FIG. 1. In block 605, a provider device, such as the provider device 145 of FIG. 1, may be activated by a user. The user may, for example, initiate a communication or make a request of a provider device using one or more user devices, such as the user device 130.

In block 610, the provider device 145 of FIG. 1 may relay the user request or otherwise request permission to service the request, such as a long distance call, from a querying entity 160 of FIG. 1. A provider system, such as a telco system in the example above, may serve as the querying entity 160, or in some examples the provider device 145 itself may be the querying entity 160.

In block 615, the querying entity 160 of FIG. 1, or an intermediary associated with the system 50, such as a security engine (not shown) or the analysis engine 125, may query the secured content storage 155 and secured electronic profile storage 140 to identify requirements for authorization of the user request to the provider device. The query may return, for example, a number or type of profile attributes which should be checked before granting the request. The query may return both requirements established by the user to grant the request and requirements established by the partner. A particular confidence level may also be returned, such as that the system must be 80 percent confident in the identity of a user to grant the request.

In block 620, the querying entity 160 of FIG. 1, or an intermediary associated with the system 50, such as a security engine (not shown) or the analysis engine 125, may query the secured electronic profile storage 140 to access the attributes specified in the requirements accessed in the block 615.

Retrieved attributes may be decoded by the decoder 127 of FIG. 1 in block 625. Note that, if the querying entity 160 does not have sufficient permission to access one or more of the profile attributes required for authentication, the attributes may not be properly decoded by the decoder 127 in some examples. In other examples, the querying entity 160 may be continuously screening for appropriate, authenticated content. If a particular provider, such as partner 155, does not have sufficient permission to access one or more of the profile attributes required for authentication, content from that provider may not be pulled onto devices associated with the electronic profile or the content may be downgraded.

In block 630, the analysis engine 125 of FIG. 1 may evaluate whether the authentication requirements have been met, based on attributes decoded by the decoder 127. The analysis engine 125 may also compute a relevance or confidence level in an identification of the user, or for a particular content item or group of items.

If the requirements are not met and/or if the computed confidence level is insufficiently high, a denial indication may be provided to the querying entity 160, and in block 635, the requesting provider device (such as provider device 145 of FIG. 1) may be disabled or may otherwise refuse the user request. In some examples, if the requirements are not met and/or if the computed confidence level is insufficiently high, the analysis engine 125 of FIG. 1 may query an entity's profile for additional attributes that may be able to meet the relevance threshold or authentication challenge, in block 632. If the requirements still are not met and/or if the computed confidence level is still insufficiently high, a denial indication may be provided to the querying entity 160, and in block 634, the requesting provider device may be disabled or may otherwise refuse the user request.

If the requirements were met and/or if the computed confidence level is sufficiently high, either following block 630 or following use of the additional attributes in block 632, an approval indication may be provided to the querying entity 160, and in block 640, the querying entity 160 may activate the provider device 145 or otherwise allow the provider device 145 to service the user request.

FIG. 7 is a schematic illustration of relevance in accordance with embodiments of the present invention. One or more domain expert corpora may be developed for use by the analysis engine 125 described above with reference to FIG. 1. These corpora are shown at a cloud level 707, and indeed may be stored in a cloud computing system. The domain expert corpora 701-706 are shown in FIG. 7. Each corpus may be stored on one or more computer readable memories, which may be shared among one or more corpora, and may be accessible to the analysis engine 125. Each corpus 701-706 may be associated with a particular domain, such as 'Healthcare', 'Travel & Leisure', and 'Entertainment' as shown in FIG. 7. Associations and Hebbian weightings may be established within each corpus describing a relationship between concepts and content. In other words, each corpus may store, for example, different weightings or relationships between a concept and the content of that corpus. As shown in FIG. 7, the concepts 'Bob Dylan', 'Lady Gaga', 'Justin Bieber', and 'U2' may be relevant for the entertainment corpus 703, and may be related to one another as shown with connections in FIG. 7. Their relevance or connections in other corpora, such as 'Healthcare', however, may be different.

A communities level 710 describes storage of relevance information at a population level. The communities 'Baby Boomers' 711, 'Drugs that contain Tylenol' 712, and 'Teenage Girls' 713 are shown in FIG. 7, along with communities 714 and 715. Each community may, for example, have an electronic profile stored in profile storage as described above. Relevance of content and concepts per community may be re-weighted for each probabilistic Hebbian association. Accordingly, the relevance of the terms 'Justin Bieber', 'Lady Gaga', 'Bob Dylan', and 'U2' for the population 'Teenage Girls' 713 is shown in FIG. 7. Accordingly, the analysis engine 125 of FIG. 1 may score the concepts shown in FIG. 7 for a 'Teenage Girls' profile or community. The difference between the relevance of concepts and content in communities, corpora, or individually, may be used by the analysis engine 125 to generate additional profile data for a community or individual.

Individual relevance scores are shown at the entity level 720. An individual profile 722 may be stored in profile storage as generally described above. The analysis engine 125 may score the same terms for the individual profile 720 to result in the weightings shown in FIG. 7. Note that the analysis engine 125 may utilize a relationship between the entity and one or more of the communities 710 to yield the relevance scores shown in FIG. 7. That is, an entity's profile may specify numerically or otherwise a relationship between the entity 722 and a community, such as 'Teenage Girls' 713. The relevance of the concepts for 'Teenage Girls' 713 may then be used by the analysis engine 125 in computing relevance scores for the individual entity 722, although the scores are not identical, they are simply used to influence (positively or negatively), the scores shown in FIG. 7.

From the foregoing it will be appreciated that, although specific embodiments of the invention have been described herein for purposes of illustration, various modifications may be made without deviating from the spirit and scope of the invention.

What is claimed is:

1. A method for providing a
secure electronic profile access by a profiling system, the method comprising:
generating, by the profiling system, a code that is used to encode the electronic profile, from a first information that is obtained from, or that is related to, a querying entity, and from a second information that is obtained from, or that is related to, a profile-owning entity;
encoding, by the profiling system, the electronic profile data using the code;
electronically receiving, by the profiling system, a query from the querying entity that requests identification of content items that are identified using scores computed from the profile data contained in a portion of the encoded electronic profile owned by the profile-owning entity and stored within the profiling system;
decoding, by the profiling system, the portion of the encoded electronic profile using the code;
scoring, by the profiling system, the content items using profile data extracted from the decoded portion of the encoded electronic profile; and
identifying the content items, by the profiling system, using the scores.

2. The method according to claim 1, wherein the request comprises a continuous monitoring of a content stream.

3. The method according to claim 1, wherein the code is based at least in part on an a physical characteristic selected from a group of physical characteristics consisting of: an electromagnetic signature, ENS, MAC address, connection impedance, connection resistance, transmission and modulation signature, energy or power attributes, and connection throughput of at least one user device associated with the second entity.

4. The method according to claim 1, wherein the code is based at least in part on a location of at least one user device associated with the second entity, whether physical, associative, or virtual.

5. The method according to claim 1, wherein the code is distributed across a plurality of physical storage devices.

6. The method according to claim 1, wherein the encoded electronic profile is distributed across a plurality of physical storage devices.

7. A physical data-storage device encoded with a set of instructions when executed performs steps for providing a secure electronic profile access by a profiling system, the steps comprising of:
generating, by the profiling system, a code that is used to encode the electronic profile, from a first information that is obtained from, or that is related to, a querying entity, and from a second information that is obtained from, or that is related to, a profile-owning entity;
encoding, by the profiling system, the electronic profile data using the code;
electronically receiving, by the profiling system, a query from the querying entity that requests identification of content items that are identified using scores computed from the profile data contained in a portion of the encoded electronic profile owned by the profile-owning entity and stored within the profiling system;
decoding, by the profiling system, the portion of the encoded electronic profile using the code;
scoring, by the profiling system, the content items using profile data extracted from the decoded portion of the encoded electronic profile; and
identifying the content items, by the profiling system, using the scores.

8. The physical data-storage device of claim 7, wherein the code comprises a compound code including data based at least in part on a plurality of aspects of the second entity.

9. The physical data-storage device of claim 7, wherein using the code comprises retrieving the code from a distributed hash table-based storage system.

10. The physical data-storage device of claim 7, wherein scoring the content item comprises retrieving the content item from a distributed hash table-based storage system.

11. The physical data-storage device of claim 7, wherein scoring the content item comprises computing a value based in least in part on the encoded electronic profile.

* * * * *